US012784612B2

(12) United States Patent
Dideriksen et al.

(10) Patent No.: US 12,784,612 B2
(45) Date of Patent: Nov. 3, 2026

(54) HUMAN ERROR PREDICTION, DETECTION, AND ALERTING SYSTEM AND METHOD USING ARTIFICIAL INTELLIGENCE (AI)

(71) Applicant: Rockwell Collins, Inc., Cedar Rapids, IA (US)

(72) Inventors: Amy L. Dideriksen, New Smyrna Beach, FL (US); Katharine Woodruff, Madison, WI (US); Joseph L. Williams, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 163 days.

(21) Appl. No.: 18/427,629

(22) Filed: Jan. 30, 2024

(65) Prior Publication Data

US 2025/0246093 A1 Jul. 31, 2025

(51) Int. Cl.
*G09B 9/052* (2006.01)

(52) U.S. Cl.
CPC .................................... *G09B 9/052* (2013.01)

(58) Field of Classification Search
None
See application file for complete search history.

(56) References Cited

U.S. PATENT DOCUMENTS

| | | | |
|---|---|---|---|
| 9,994,228 | B2 | 6/2018 | Krueger et al. |
| 10,031,520 | B2 | 7/2018 | Rodas et al. |
| 10,426,393 | B2 | 10/2019 | Bosworth et al. |
| 10,437,327 | B2 | 10/2019 | Sengelaub et al. |
| 10,710,594 | B2 | 7/2020 | Zhao et al. |
| 2009/0326735 | A1 | 12/2009 | Wood et al. |
| 2010/0228533 | A1 | 9/2010 | Cummings et al. |
| 2013/0124076 | A1 | 5/2013 | Bruni et al. |
| 2017/0249824 | A1 | 8/2017 | Kaplan et al. |
| 2019/0092337 | A1 | 3/2019 | Chua et al. |
| 2019/0196464 | A1 | 6/2019 | Lockwood et al. |
| 2020/0057487 | A1 * | 2/2020 | Sicconi .................. G06F 3/011 |
| 2022/0386915 | A1 | 12/2022 | Rao et al. |
| 2022/0392237 | A1 | 12/2022 | Wu et al. |

(Continued)

FOREIGN PATENT DOCUMENTS

EP 2647959 A1 10/2013

OTHER PUBLICATIONS

European Search Report received in EP Application No. 25151203.4, Jun. 3, 2025, 10 pages.

(Continued)

*Primary Examiner* — James B Hull
(74) *Attorney, Agent, or Firm* — Suiter Swantz IP

(57) ABSTRACT

A system may include at least one sensor and at least one processor configured to, based at least on stress data, at least one of (i) identify at least one occurrence of at least one potential for at least one human error or (ii) predict the at least one occurrence of the at least one potential for the at least one human error; and upon an identification and/or a prediction, output at least one instruction to cause (a) a modification to a human machine interface (HMI) device that interfaces with a user, (b) a modification to an amount of automated digital assistance provided to the user, (c) a modification of content presented to the user, (d) an alert to the user, and/or (e) a presentation of a solution to increase comprehension by the user.

17 Claims, 4 Drawing Sheets

(56) References Cited

U.S. PATENT DOCUMENTS

| | | | |
|---|---|---|---|
| 2022/0392261 A1 | 12/2022 | George et al. |
| 2022/0392354 A1 | 12/2022 | Rao et al. |
| 2023/0043771 A1 | 2/2023 | Wu et al. |
| 2023/0169365 A1 | 6/2023 | Wu et al. |
| 2023/0293114 A1 | 9/2023 | Berthelot |

OTHER PUBLICATIONS

Liu Jing et al: "Cognitive pilot-aircraft interface for single-pilot operations", Knowledge-Based Systems, Elsevier, Amsterdam, NL, vol. 112, Sep. 6, 2016 (Sep. 6, 2016), pp. 37-53, XP029757287, ISSN: 0950-7051, DOI: 10.1016/J.KNOSYS.2016.08.031.

Schmitt Fabian et al: "Experimental Evaluation of a Scalable Mixed-Initiative Planning Associate for Future Military Helicopter Missions", May 30, 2018 (May 30, 2018), SAT 2015 18th International Conference, Austin, TX, USA, Sep. 24-27, 2015; [Lecture Notes in Computer Science; Lect.Notes Computer], Springer, Berlin, Heidelberg, pp. 649-663, XP047478618, ISBN: 978-3-540-74549-5 [retrieved on May 30, 2018].

* cited by examiner

HUMAN ERROR PREDICTION, DETECTION, AND ALERTING SYSTEM AND METHOD USING ARTIFICIAL INTELLIGENCE (AI)

BACKGROUND

Currently, humans, such as pilots, are prone to human error, which can be caused by stress. Such human errors can lead to mission failures or safety problems.

SUMMARY

In one aspect, embodiments of the inventive concepts disclosed herein are directed to a system. The system may include at least one sensor and at least one processor communicatively coupled to the at least one sensor. The at least one processor is configured to: obtain sensor data from one or more of the at least one sensor; obtain stress data, the stress data including objective measures of stresses, the stresses including at least one physical stress, at least one external stress, and at least one mental stress, at least some of the objective measures of stresses associated with the sensor data; obtain a trained artificial intelligence (AI) and/or machine learning (ML) model; based at least on the stress data and the trained AI and/or ML model, at least one of (i) identify at least one occurrence of at least one potential for at least one human error or (ii) predict the at least one occurrence of the at least one potential for the at least one human error; and upon an identification and/or a prediction of the at least one occurrence of the at least one potential for the at least one human error, output at least one instruction to cause at least one of (a) at least one modification to at least one human machine interface (HMI) device that interfaces with at least one user, (b) at least one modification to an amount of automated digital assistance provided to the at least one user, (c) at least one modification of content presented to the at least one user, (d) at least one alert to the at least one user, or (e) a presentation of at least one solution to increase comprehension by the at least one use.

In a further aspect, embodiments of the inventive concepts disclosed herein are directed to a method. The method may include: obtaining, by at least one processor, sensor data from one or more of the at least one sensor, the at least one processor communicatively coupled to the at least one sensor; obtaining, by the at least one processor, stress data, the stress data including objective measures of stresses, the stresses including at least one physical stress, at least one external stress, and at least one mental stress, at least some of the objective measures of stresses associated with the sensor data; obtaining, by the at least one processor, a trained artificial intelligence (AI) and/or machine learning (ML) model; based at least on the stress data and the trained AI and/or ML model, at least one of (i) identifying, by the at least one processor, at least one occurrence of at least one potential for at least one human error or (ii) predicting, by the at least one processor, the at least one occurrence of the at least one potential for the at least one human error; and upon an identification and/or a prediction of the at least one occurrence of the at least one potential for the at least one human error, outputting, by the at least one processor, at least one instruction to cause at least one of (a) at least one modification to at least one human machine interface (HMI) device that interfaces with at least one user, (b) at least one modification to an amount of automated digital assistance provided to the at least one user, (c) at least one modification of content presented to the at least one user, (d) at least one alert to the at least one user, or (e) a presentation of at least one solution to increase comprehension by the at least one user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
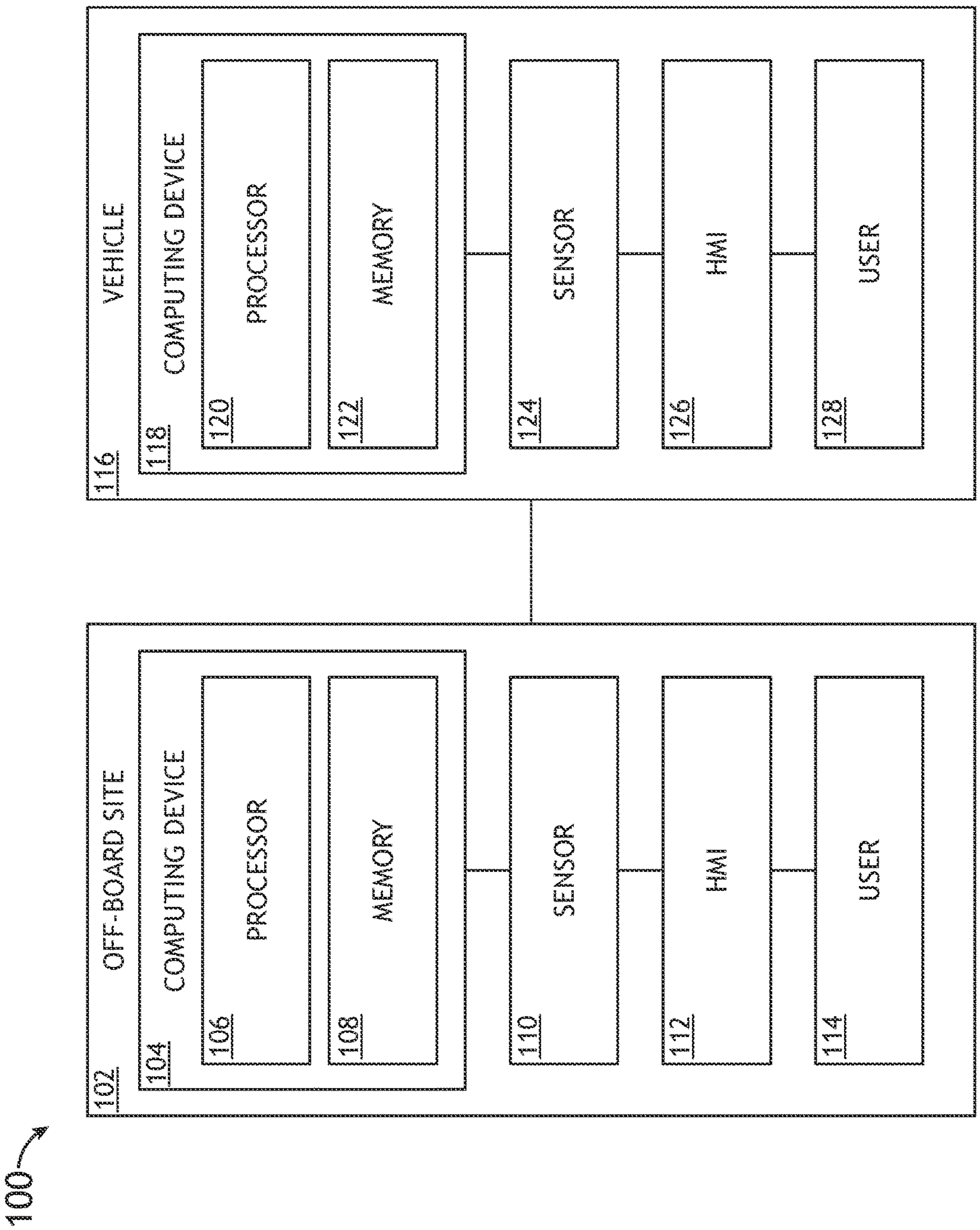
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and system including sensors and at least one processor configured to, based at least on stress data, at least one of (i) identify at least one occurrence of at least one potential for at least one human error or (ii) predict the at least one occurrence of the at least one potential for the at least one human error.

Some embodiments may use a human factors causal loop analysis based at least on collected objective measures of physical stress, external stress, and/or mental stress to detect, predict, and/or alert when pilot oversaturation may occur, is occurring, and/or has occurred. By collecting objective measures of world state(s) (e.g., environmental sensor data), machine state(s) (e.g., machine sensor data), and/or human state(s) (e.g., physiological sensor data) (e.g., in near real-time, real-time, and/or previously collected), some embodiments can apply machine learning (ML) and/or artificial intelligence (AI) algorithm(s) to detect and/or predict a potential(s) for human error(s).

Some embodiments, which can detect and/or predict the potential(s) for human error(s), may be configured to customize operator support when needed, such as through digital assistance and/or AI assistance.

Some embodiments are provided for military pilots performing command and control over unmanned aerial vehicles (UAVs). However, other embodiments are not limited to this use case or domain. Some embodiments may be applied to commercial airline pilots during routine or abnormal operations. Some embodiments may be applied for astronauts during live space missions or for air traffic controllers guiding multiple aircraft on the ground or in the air. Some embodiments may be applied to any suitable domain, industry, or platform, for example, where autonomy exists with a human-in and/or a human-on the loop allows for this solution to assist to reduce the risk of human errors.

In some embodiments, through a collection of objective measures of physical stress, external stress, and/or mental stress, a human factors causal loop analysis can be used to detect, predict, and/or alert pilots and/or digital assistants of the potential for human error. By collecting quantitative measures prior to and/or in near real-time, machine learning and artificial intelligence algorithms can be used to identify and predict when human errors may occur. Having this ability may allow for customization for human operator support through digital assistance. For example, this assistance could be in the form of alerting, providing a decision aid, modification of an HMI, or through adapting levels of autonomy.

Referring now to FIG. 1, an exemplary embodiment of a system 100 according to the inventive concepts disclosed herein is depicted. In some embodiments, the system 100 may include at least one site (e.g., at least one offboard site 102) and/or at least one machine (e.g., at least one computer, at least one equipment machine (e.g., at least one construction equipment machine and/or at least one manufacturer equipment machine), at least one vehicle 116 (e.g., which may be manned, unmanned, and/or remote operated; e.g., at least one military or civilian vehicle; e.g., at least one automobile, at least one train, at least one watercraft, at least one spacecraft, or at least one aircraft (e.g., at least one helicopter, at least one airplane, and/or at least one unmanned aerial vehicle (UAV)))), some or all of which may be communicatively coupled at any given time.

Each off-board site 102 may include at least one computing device 104, at least one sensor 110, at least one human-machine interface (HMI) 112, and/or at least one user 114, some or all of which may be communicatively coupled at any given time.

Each computing device 104 may be any suitable computing device, such as a mobile computing device (e.g., a phone computing device, a laptop computer, or a tablet computing device), a personal computer, and/or server computing device. Each computing device 104 may include any or all of the elements, as shown in FIG. 1. For example, the computing device 104 may include at least one processor 106, at least one memory 108 (e.g., which may maintain a trained artificial intelligence (AI) and/or machine learning (ML) model), and/or at least one storage, some or all of which may be communicatively coupled at any given time. For example, the at least one processor 106 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 106 may include a CPU and a GPU configured to perform (e.g., collectively perform) any of the operations disclosed throughout. The processor 106 may be configured to run various software applications or computer code stored (e.g., maintained) in a non-transitory computer-readable medium (e.g., memory 108 and/or storage) and configured to execute various instructions or operations. For example, the processor 106 of the computing device 104 may be configured to: obtain sensor data from one or more of the at least one sensor (e.g., 110 and/or 124); obtain stress data, the stress data including objective measures of stresses, the stresses including at least one physical stress, at least one external stress, and at least one mental stress, at least some of the objective measures of stresses associated with the sensor data; obtain a trained artificial intelligence (AI) and/or machine learning (ML) model; based at least on the stress data and the trained AI and/or ML model, at least one of (i) identify at least one occurrence of at least one potential for at least one human error or (ii) predict the at least one occurrence of the at least one potential for the at least one human error; and/or upon an identification and/or a prediction of the at least one occurrence of the at least one potential for the at least one human error, output at least one instruction to cause at least one of (a) at least one modification to at least one human machine interface (HMI) device (e.g., 112 and/or 126) that interfaces with at least one user (e.g., 114 and/or 128), (b) at least one modification to an amount of automated digital assistance (e.g., via the at least one HMI device (e.g., 112 and/or 126)) provided to the at least one user (e.g., 114 and/or 128), (c) at least one modification of content presented (e.g., by the at least one HMI device (e.g., 112 and/or 126)) to the at least one user (e.g., 114 and/or 128), (d) at least one alert (e.g., via the at least one HMI device (e.g., 112 and/or 126)) to the at least one user (e.g., 114 and/or 128), or (e) a presentation (e.g., by the at least one HMI device (e.g., 112 and/or 126)) of at least one solution to increase comprehension by the at least one user (e.g., 114 and/or 128).

Each sensor 110 may be any suitable sensor, such as a heart rate sensor, cognitive workload sensor (e.g. an electrocardiogram (ECG) sensor of a cognitive assessment toolset (CATS)), a blood oxygen sensor (e.g., an SpO2 sensor), an eye tracking sensor (e.g., a camera for tracking eye movement, gaze (e.g., a location of eye focus), a blink rate, and/or a pupil size), a sleep monitor, a communication system (e.g. a radio) output (e.g., for detecting when a communication message was received at the site 102 and/or the vehicle 116). Each sensor 110 may be configured to output sensor data.

Each HMI 112 may be any suitable HMI, such as a display (e.g., a touchscreen display), a speaker, a haptic device (e.g., a motorized vibratory device or an ultrasonic transducer), a gesture recognition system (e.g., a camera and a processor), an indicator (e.g., a light emitting diode (LED) indicator), a keyboard, a joystick, a mouse, a track pad, a touch pad, a touchscreen, a microphone, a voice recognition system (e.g., including a microphone and a processor), a steering yolk, or an aircraft stick.

Each user 114 may be any suitable user, such as a remote operator (e.g., a remote pilot and/or a remote vehicle operator), a remote commander of a single vehicle 116 or a team of vehicles (e.g., 116; e.g., a team of UAVs), a manager, a safety monitor, a supervisor, an administrator, and/or a traffic controller (e.g., an air traffic controller).

Each vehicle 116 may include at least one computing device 118, at least one sensor 124, at least one human-machine interface (HMI) 126, and/or at least one user 128, some or all of which may be communicatively coupled at any given time. In some embodiments, such as where the vehicle is an unmanned vehicle, the vehicle 116 may lack the HMIs 126 and/or the users 128.

Each computing device 118 may be any suitable computing device, such as a vehicle (e.g., aircraft) computing device and/or vetronics (e.g., avionics) computing device. Each computing device 118 may include any or all of the elements, as shown in FIG. 1. For example, the computing device 118 may include at least one processor 120, at least one memory 122 (e.g., which may maintain a trained artificial intelligence (AI) and/or machine learning (ML) model), and/or at least one storage, some or all of which may be communicatively coupled at any given time. For example, the at least one processor 120 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 120 may include a CPU and a GPU configured to perform (e.g., collectively perform) any of the operations disclosed throughout. The processor 120 may be configured to run various software applications or computer code stored (e.g., maintained) in a non-transitory computer-readable medium (e.g., memory 122 and/or storage) and configured to execute various instructions or operations. For example, the processor 120 of the computing device 118 may be configured to: obtain sensor data from one or more of the at least one sensor (e.g., 110 and/or 124); obtain stress data, the stress data including objective measures of stresses, the stresses including at least one physical stress, at least one external stress, and at least one mental stress, at least some of the objective measures of stresses associated with the sensor data; obtain a trained artificial intelligence (AI) and/or machine learning (ML) model; based at least on the stress data and the trained AI and/or ML model, at least one of (i) identify at least one occurrence of at least one potential for at least one human error or (ii) predict the at least one occurrence of the at least one potential for the at least one human error; and/or upon an identification and/or a prediction of the at least one occurrence of the at least one potential for the at least one human error, output at least one instruction to cause at least one of (a) at least one modification to at least one human machine interface (HMI) device (e.g., 112 and/or 126) that interfaces with at least one user (e.g., 114 and/or 128), (b) at least one modification to an amount of automated digital assistance (e.g., via the at least one HMI device (e.g., 112 and/or 126)) provided to the at least one user (e.g., 114 and/or 128), (c) at least one modification of content presented (e.g., by the at least one HMI device (e.g., 112 and/or 126)) to the at least one user (e.g., 114 and/or 128), (d) at least one alert (e.g., via the at least one HMI device (e.g., 112 and/or 126)) to the at least one user (e.g., 114 and/or 128), or (e) a presentation (e.g., by the at least one HMI device (e.g., 112 and/or 126)) of at least one solution to increase comprehension by the at least one user (e.g., 114 and/or 128).

Each sensor 124 may be any suitable sensor, such as a heart rate sensor, a cognitive workload sensor (e.g. an electrocardiogram (ECG) sensor of a cognitive assessment toolset (CATS)), a blood oxygen sensor (e.g., an SpO2 sensor), an eye tracking sensor (e.g., a camera for tracking eye movement, gaze (e.g., a location of eye focus), a blink rate, and/or a pupil size), a sleep monitor, an altimeter (e.g., a radio altimeter), a global navigation satellite system (GNSS) (e.g., global positioning satellite (GPS)) device, a wind speed sensor, an airspeed sensor, a battery sensor, a fuel gauge sensor, a long-range precision missile (LRPM; e.g., such as a missile) sensor, a UAV sensor (e.g., for detecting whether there is a UAV available for launch), a team (e.g., a UAV team) sensor (e.g., for detecting whether a full team has been deployed), at least one avionics device output (e.g., a flight management system (FMS) output; e.g., an output of a predicted flight path), a rudder sensor (e.g., for detecting a rudder malfunction), a throttle sensor (e.g., for detecting a stuck throttle), a communication system (e.g. a radio) output (e.g., for detecting when a communication message was received at the site 102 and/or the vehicle 116), a visibility sensor (e.g., an environmental camera), and/or a weather radar system. Each sensor 110 may be configured to output sensor data.

Each HMI 126 may be any suitable HMI, such as a display (e.g., a touchscreen display), a speaker, a haptic device (e.g., a motorized vibratory device or an ultrasonic transducer), a gesture recognition system (e.g., a camera and a processor), an indicator (e.g., an light emitting diode (LED) indicator), a keyboard, a joystick, a mouse, a track pad, a touch pad, a touchscreen, a microphone, a voice recognition system (e.g., including a microphone and a processor), a steering yolk, or an aircraft stick.

Each user 128 may be any suitable user, such as an operator (e.g., a pilot and/or vehicle operator), a commander of a single vehicle 116 or of a team of vehicles (e.g., 116), a manager, a safety monitor, a supervisor, and/or an administrator.

In some embodiments, the at least one processor (e.g., 106 and/or 120) may be configured (e.g., collectively configured, if there is more than one processor (e.g., 106 and/or 120) and/or if more than one processor (e.g., 106 and/or 120) are distributed among more than one computing device (e.g., 104 and/or 118)) to: obtain sensor data from one or more of the at least one sensor (e.g., 110 and/or 124); obtain stress data, the stress data including objective measures of stresses, the stresses including at least one physical stress, at least one external stress, and at least one mental stress, at least some of the objective measures of stresses associated with the sensor data; obtain a trained artificial intelligence (AI) and/or machine learning (ML) model; based at least on the stress data and the trained AI and/or ML model, at least one of (i) identify at least one occurrence of at least one potential for at least one human error or (ii) predict the at least one occurrence of the at least one potential for the at least one human error; and/or upon an identification and/or a prediction of the at least one occurrence of the at least one potential for the at least one human error, output at least one instruction to cause at least one of (a) at least one modification to at least one human machine interface (HMI) device (e.g., 112 and/or 126) that interfaces with at least one user (e.g., 114 and/or 128), (b) at least one modification to an amount of automated digital assistance (e.g., via the at least one HMI device (e.g., 112 and/or 126)) provided to the at least one user (e.g., 114 and/or 128), (c) at least one modification of content presented (e.g., by the at least one HMI device (e.g., 112 and/or 126)) to the at least one user (e.g., 114 and/or 128), (d) at least one alert (e.g., via the at least one HMI device (e.g., 112 and/or 126)) to the at least one user (e.g., 114 and/or 128), or (e) a presentation (e.g., by the at least one HMI device (e.g., 112 and/or 126)) of at least one solution to increase comprehension by the at least one user (e.g., 114 and/or 128).

For example, with respect to the HMIs (e.g., 112 and/or 126), upon an identification and/or a prediction of the at least one occurrence of the at least one potential for the at least one human error, some embodiments may output at least one instruction to cause: content on displays to be modified to reduce cognitive workload; a visual alert(s) (e.g., through flashing or changing icons) to increase perception; provide recommended solutions to increase comprehension and projection; provide an automated audible speech alert; provide an audible text to speech translation; and/or provide an acoustic alarm(s) and/or notifications; provide a vibration alert and/or feedback (e.g., an a vibration in a seat, aircraft stick, and/or vehicle steering column).

For example, with respect to the HMIs (e.g., 112 and/or 126), upon an identification and/or a prediction of the at least one occurrence of the at least one potential for the at least one human error, some embodiments may output at least one instruction to cause: an increase in automation to offset human operator task load and/or information processing when cognitive workload is determined to be relatively high; a decrease in automation to offset human operator task load and/or information processing when cognitive workload is determined to be relatively low; and/or provide a decision aid and/or digital assistant to increase situational awareness and/or decision making.

In some embodiments, the trained AI and/or ML model 110 may be trained using a supervised learning technique. In some embodiments, the trained artificial intelligence (AI) and/or machine learning (ML) model is a causal AI model. For example, the causal AI model may be based at least on a human factors causal loop analysis (e.g., 300, such as exemplarily shown in FIG. 3).

In some embodiments, the at least one user (e.g., 114 and/or 128) comprises at least one operator of at least one vehicle (e.g., 116). In some embodiments, the at least one vehicle (e.g., 116) comprises at least one of at least one aircraft or at least one spacecraft. In some embodiments, the at least one vehicle (e.g., 116) comprises the at least one aircraft, wherein the at least one aircraft comprises at least one manned aircraft. In some embodiments, the at least one vehicle (e.g., 116) comprises the at least one aircraft, wherein the at least one aircraft comprises at least one unmanned aerial vehicle (UAV). In some embodiments, the at least one UAV comprises multiple UAVs, wherein at least two of the multiple UAVs are operated by a single user of the at least one user (e.g., 114 and/or 128).

In some embodiments, the at least one physical stress comprises at least one measurement of at least one of: at least one nutrition factor, at least one work factor, at least one exercise factor, at least one sleep factor, at least one hydration factor, and/or at least one stimulant factor. In some embodiments, the at least one external stress comprises at least one measurement of at least one of: at least one execution factor, at least one machine status factor, and/or at least one world factor. In some embodiments, the at least one mental stress comprises at least one measurement of at least one of: at least one situation awareness factor, at least one cognitive workload factor, and/or at least one training factor.

In some embodiments, the stress data may include subjective measures of the stresses and the objective measures of the stresses, and some of the stress data is collected in real-time and other of the stress data is collected prior to in real-time, wherein some of the stresses are directly measurable, wherein other of the stresses are not directly measurable. In some embodiments, all of the stress data is collected in real-time. In some embodiments, all of the stress data is collected prior to in real-time. In some embodiments, all of the stresses are directly measurable. In some embodiments, all of the stresses are not directly measurable.

In some embodiments, the trained AI and/or ML model uses weightings, the weightings comprising a first weighting of at least 20% (e.g., approximately 33%+/−1%) for the at least one physical stress, a second weighting of at least 20% (e.g., approximately 33%+/−1%) for the at least one external stress, and/or a third weighting of at least 20% (e.g., approximately 33%+/−1%) for the at least one mental stress, wherein the weightings total 100%. In some embodiments, the at least one physical stress is multiple physical stresses comprising at least one nutrition factor, at least one work factor, at least one exercise factor, at least one sleep factor, and/or at least one stimulant factor, wherein the first weighting for the multiple physical stresses comprises physical stress sub-weightings of at least 10% (e.g., 20%+/−1%) for each of the at least one nutrition factor, the at least one work factor, the at least one exercise factor, the at least one sleep factor, and/or the at least one stimulant factor, wherein the physical stress sub-weightings total 100%. In some embodiments, the at least one mental stress is multiple mental stresses comprising at least one situation awareness factor, at least one cognitive workload factor, and/or at least one training factor, wherein the second weighting for the multiple mental stresses comprises mental stress sub-weightings of at least 15% (e.g., 33%+/−1%) for each of the at least one situation awareness factor, the at least one cognitive workload factor, and/or the at least one training factor, wherein the mental stress sub-weightings total 100%. In some embodiments, the at least one physical stress is multiple physical stresses comprising at least one nutrition factor, at least one work factor, at least one exercise factor, at least one sleep factor, and/or at least one stimulant factor, wherein the first weighting for the multiple physical stresses comprises physical stress sub-weightings of at least 10% (e.g., 20%+/−1%) for each of the at least one nutrition factor, the at least one work factor, the at least one exercise factor, the at least one sleep factor, and/or the at least one stimulant factor, wherein the physical stress sub-weightings total 100%, wherein the at least one mental stress is multiple mental stresses comprising at least one situation awareness factor, at least one cognitive workload factor, and/or at least one training factor, wherein the second weighting for the multiple mental stresses comprises mental stress sub-weightings of at least 15% (e.g., 33%+/−1%) for each of the at least one situation awareness factor, the at least one cognitive workload factor, and/or the at least one training factor, wherein the mental stress sub-weightings total 100%, wherein the at least one exercise factor comprises multiple exercise factors comprising whether each of the at least one user exercised within eight hours before a work shift of said user and/or an amount of exercise each of the at least one user gets on average, wherein each of the multiple exercise factors has an exercise factor sub-weighting of at least 25% (e.g., 50%+/−1%), wherein the exercise factor sub-weightings total 100%, wherein the at least one training factor comprises multiple training factors comprising a total number hours of aircraft (e.g., helicopter) training for each of the at least one user, a number of combat missions flown for each of the at least one user, whether each of the at least one user has a flown a multi-crew aircraft (e.g., helicopters), a number of years of service in an industry (e.g., military and/or commercial airlines) for each of the at least one user, a current service role for each of the at least one user, and a number of years in aircraft—(e.g., helicopter—) related roles for each of the at least one user, wherein each of the multiple experience factors has an experience factor sub-weighting of at least 10%, wherein the experience factor sub-weightings total 100%.

While exemplary weighting percentages have been provided above and throughout, some embodiments may include any suitable weighting percentages.

Figure 2:
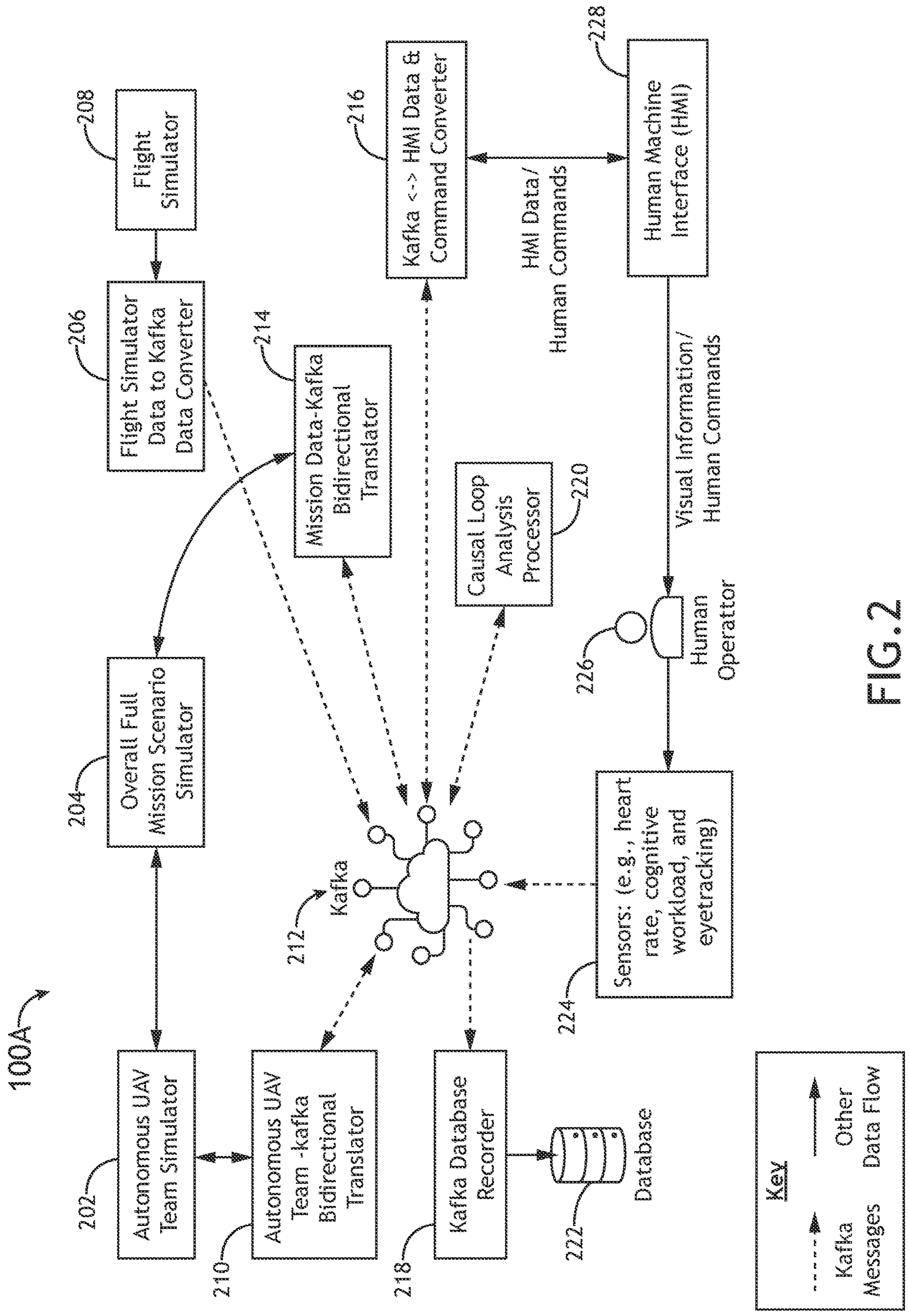
FIG. 2 is a view of an exemplary embodiment of a test system according to the inventive concepts disclosed herein.

Referring now to FIG. 2, an exemplary embodiment of a test system 100A according to the inventive concepts disclosed herein is depicted. The system 100A corresponds to an exemplary tested platform which ran an exemplary simulation with test subjects, according to the inventive concepts disclosed. In such exemplary embodiment, the system 100A included an autonomous UAV team simulator 202, an overall full mission scenario simulator 204, a flight simulator data to Kafka data converter 206, a flight simulator 208, an autonomous UAV team-Kafka bidirectional translator 210, a Kafka server 212, a mission data-Kafka bidirectional translator 214, a Kafka↔HMI data and command converter 216, a Kafka database recorder 218, a causal loop analysis processor 220, a database 222, sensors 224, a human operator(s) 226, and an HMI 228, some or all of which were communicatively coupled at any given time. The data flows included Kafka messages and other data flows. Any or all of the elements of FIG. 2, may be implemented as at least one computing device and/or as a software module(s) that is/are implemented on at least one computing device including at least one processor and/or at least one memory (similarly to as shown in and/or disclosed with respect to FIG. 1).

The system 100A provided an exemplary setup for testing an exemplary detection, prediction, and/or alerting of potential for human error, in accordance with the inventive concepts disclosed throughout. Some embodiments may include any suitable system 100 setup.

The flight simulator data to Kafka data converter 206, the autonomous UAV team-Kafka bidirectional translator 210, the mission data-Kafka bidirectional translator 214, the Kafka↔HMI data and command converter 216, the Kafka database recorder 218, and the sensors 224 were responsible for translating Kafka messages to or from another data format. The simulation elements included the autonomous UAV team simulator 202, the overall full mission scenario simulator 204, the flight simulator 208, and the HMI 228.

As exemplarily used for the system 100A, Kafka is a communication protocol and corresponding set of software modules. It is built to help facilitate and simplify communication between other software modules. These modules can be on the same physical machine or separated by any distance across the internet. It is well-established and used by some large companies for critical data infrastructure.

The autonomous UAV team simulator 202 was exemplarily responsible for simulating the movements, messages (e.g., both intra-team and external), and sensory information gathered by the UAV team. In addition to their autonomous operations, the autonomous UAV team simulator 202 also responded properly to commands received via the Autonomous UAV Team-Kafka Bidirectional Translator 210.

The Autonomous UAV Team-Kafka Bidirectional Translator 210 was responsible for two things. First, Autonomous UAV Team-Kafka Bidirectional Translator 210 listened to the UAV team's external messages produced by the Autonomous UAV Team Simulator 202 and translated such messages into Kafka messages, which were broadcast across the Kafka network. Second, Autonomous UAV Team-Kafka Bidirectional Translator 210 listened for specific Kafka messages that were directed to the Autonomous UAV team simulator 202. Upon receipt of such a message, such message was translated into the communication protocol used by UAV team and sent into the simulation. The Autonomous UAV Team-Kafka Bidirectional Translator 210 did not make any decisions, and all messages of appropriate types were translated with no regard for their content.

The Kafka database recorder 218 subscribed to all messages of all types that were sent across the Kafka network. The Kafka database recorder 218 recorded such messages in a database 222 with a corresponding timestamp to allow for accurate data recording and later playback of scenarios.

The sensors 224 (e.g., human sensors, for this test example) included multiple sensors set up to record a current state of the human operator 226. In this test case of this experiment, heart rate, mental workload, and eye-tracking were all recorded, though other embodiments for this model are not limited to those sensors 224. For example, any sensor which records periodic data about a state of a human could be used. All the sensor data was turned into Kafka messages and sent across the network.

The overall full mission scenario simulator 204 was the simulation engine responsible for guiding the overall scenario. The overall full mission scenario simulator 204 controlled all entities in the scenario except for the UAV team and the helicopter controlled by the flight simulator.

The Mission Data-Kafka Bidirectional Translator 214 was the module responsible for listening to all the messages that the overall full mission scenario simulator 204 required, translated such messages from Kafka, and provided such translated messages to the overall full mission scenario simulator 204. The Mission Data-Kafka Bidirectional Translator 214 also took data broadcast by the overall full mission scenario simulator 204, translated such data into Kafka messages, and sent such Kafka messages across the Kafka network. The Mission Data-Kafka Bidirectional Translator 214 made no determination about reasons behind messages and made no decision based on such messages; the Mission Data-Kafka Bidirectional Translator 214 translated every message that met appropriate criteria.

The Flight Simulator Data to Kafka Data Converter 206 listened to messages from the flight simulator 208 regarding its location, heading, and speed. The Flight Simulator Data to Kafka Data Converter 206 translated those messages and broadcasted such messages to the Kafka network.

The Flight Simulator 208 mimicked a military helicopter that would be the primary launch and control vehicle for the UAVs. For the purposes of this diagram, the UAV HMI provided to the human operator was considered a different module, despite being physically in the flight simulator 208.

The Kafka HMI↔Data & Command Converter 216 listened to commands input into the HMI 228 by the human operator 226, translated such commands into UAV team commands (in Kafka form), and broadcasted such translated commands across the Kafka network. The Kafka HMI↔Data & Command Converter 216 also listened to the Kafka messages pertaining to data from the UAV team and translated such Kafka messages into information the HMIs 228 could interpret.

The Human Machine Interface (HMI) 228 was the interface device(s) presented to the human operator 226 with current UAV team status and required the human operator 226 to provide the UAV team with further commands.

The causal loop analysis processor 220 took in the totality of what was occurring with the UAV team, in the flight simulator 208, and biometric data from the human operator 226. Using all of such inputs, the causal loop analysis processor 220 made determinations about a cognitive state (s) of the human operator 226 and the probability of the human operator 226 making an error (e.g., a mistake). The output of such analysis by the causal loop analysis processor 220 was broadcast back across the Kafka network.

As exemplarily used in the test example with respect to FIG. 1, the flight simulator 208 included six displays, wherein two were out-the-window views, one was the copilot (test subject)'s main view, one was the center console between the pilots, one was the pilot's main view, and one was a small tablet with mission details. Yellowstone and Katmai were used in conjunction to provide all of the views (internal and external) for the pilots in the simulator except for the test HMI 228. Pinnacles hosted the software which provided the test HMI 228 and accepted touch-screen input from that HMI 228 to submit back to the system 100A. It also was responsible for listening to the eye-tracking hardware, collecting that data, and broadcasting such eye tracking data on Kafka. Glacier was a Linux server which hosted the Kafka infrastructure. The following elements were also run on Glacier: the database; the script which listened to Kafka and wrote data to the database 222; the script which converted full-scenario data to Kafka; the bi-directional translator between HMI data/commands and Kafka; and the script which listened to flight simulator data and broadcasted the flight simulator data on to Kafka. Palantir was responsible for two simulation elements: simulation of all of the interconnected modules that would run on the autonomous UAV team; and simulation of the full scenario, sending out updates on the location and status of all relevant simulation elements. VMHOST1-DEVO was a powerful machine that hosted the simulation software for the overall scenario, the simulation of the automated UAV team, and the translation software that listened to the team and sent out messages understandable outside of the VMHOST1-DEVO.

Figure 3:
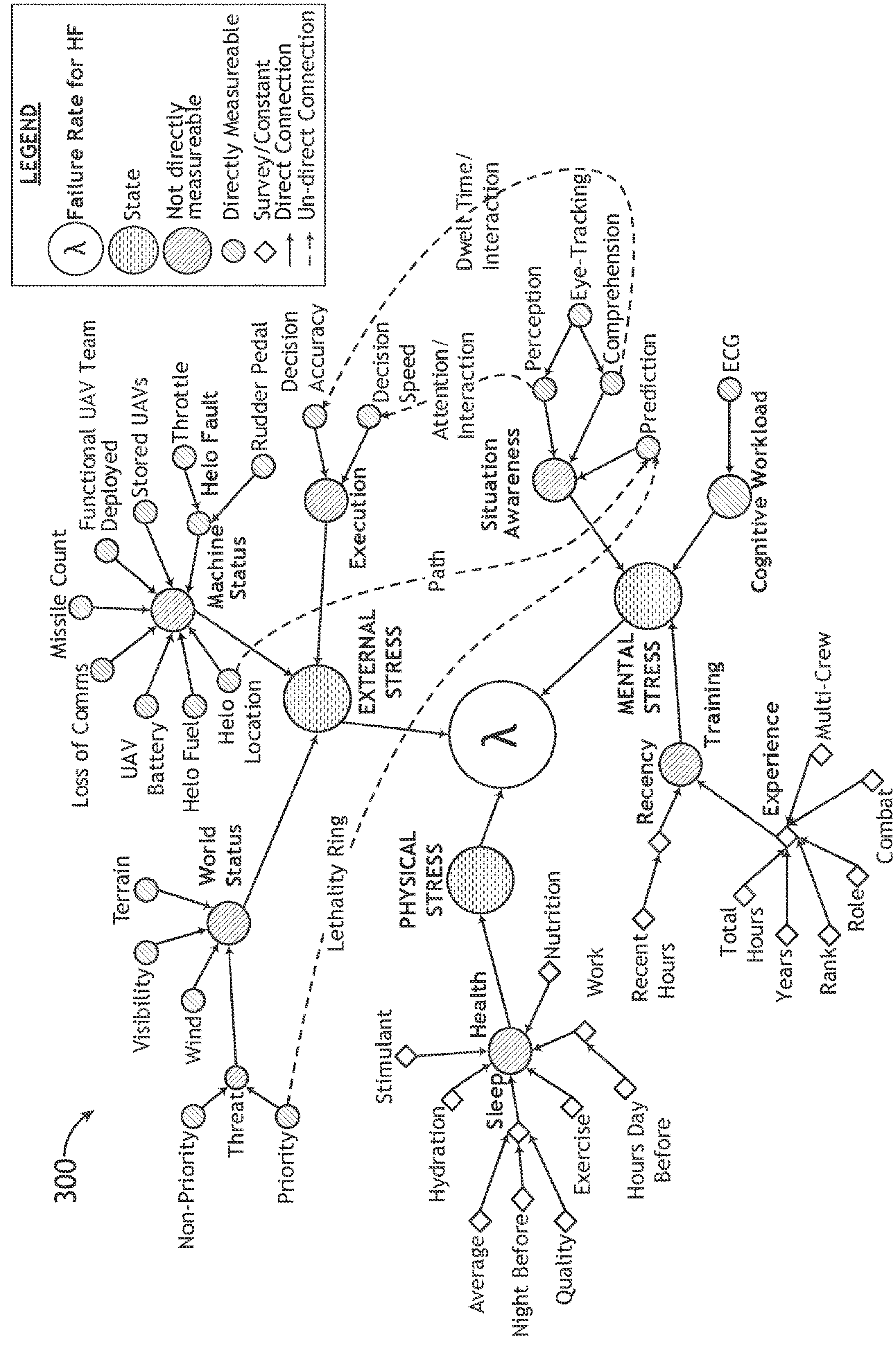
FIG. 3 is a view of an exemplary embodiment of an exemplary human factor causal loop according to the inventive concepts disclosed herein.

Referring now to FIG. 3, an exemplary embodiment of an exemplary human factor causal loop 300 according to the inventive concepts disclosed herein is depicted. The exemplary human factor causal loop 300 and related context to an exemplary situation, as set forth in FIG. 3 and below, are merely exemplary and non-limiting, other embodiments may utilize any suitable human factor causal loop designed for a given situation and platform.

In some embodiments, through a collection of objective measures of physical stress, external stress, and/or mental stress, a human factors causal loop analysis 300 can be used to detect, predict, and/or alert pilots and/or digital assistants of the potential for human error. By collecting quantitative measures prior to and/or in near real-time, machine learning and artificial intelligence algorithms can be used to identify and predict when human errors may occur. Having this ability may allow for customization for human operator support through digital assistance. For example, this assistance could be in the form of alerting, providing a decision aid, modification of an HMI, or through adapting levels of autonomy.

For example, at least one processor (e.g., 106 and/or 120) may be configured to perform causal loop analysis (CLA) operations, for example, with a goal to detect and/or predict the potential(s) for human error(s) and/or to provide an alert to mitigate that error from occurring. In some embodiments, the probability of human error may be primarily driven by human stress. For example, human stress may be calculated as including parts (e.g., equal parts, for some embodiments) "physical stress", "external stress", and/or "mental stress". As shown in FIG. 3, each stress category may include a tree of input factors that provide quantifiable measures of stress.

Some of the quantitative data may be subjectively provided by a user (e.g., a human operator), and some of the data may be collected objectively through sensors (e.g., for human physiological state data, external state data, and aircraft state data).

Physical stress may include: health, stimulants, hydration, sleep, exercise, work, and/or nutrition.

Mental stress may include: training, cognitive workload, and/or attention. Training may include training recency and experience.

External stress may include: world status, machine status, and/or execution. World status may include terrain, target identification (ID), wind, and/or visibility. Machine status may include UAV battery, helicopter fuel, helicopter location, long-range precision munition (LRPM) (e.g., a missile) status, deployed UAVs, stored UAVs, throttle and/or pedal fault, and/or loss of communications (comms). Execution may include decision accuracy and/or speed.

For example, survey data may be collected and/or provided by the human operator prior to completing an exercise and may remain static throughout an event (and/or the exercise).

In some embodiments, the sensor data may be collected continuously, for example, in near real-time. The sensor data may be received at different rates, though an output from CLA operations may be at a different prescribed rate. In some embodiments, performance of the CLA operations may use a snapshot of a current set of inputs, calculate resulting values, and send that data out onto a network (e.g., a Kafka network, or any suitable network) while, simultaneously, the data continues to flow in.

As the at least one processor (e.g., 106 and/or 120), performing the CLA operations, calculates output trends upward, there may be an increasingly greater risk of human error. The CLA operations can be customized for different levels of risk parameters.

With respect to physical stress, sleep may include (e.g., be defined by) three responses from survey data collected prior to experimental data collection: first as a binary value where if the subject had 7 to 10 hours of sleep the night prior to the study, the subject received a 1, and if they had more or less sleep, they receive a 0; second as a binary value where the average hours of sleep will be recorded as a 0 if it was more or less than 7 to 10 hours of sleep and a 1 if it was 7 to 10 hours; and third, the quality of sleep may be recorded using a Likert scale of 1 to 5, 1 being poor quality, and 5 being high quality. The value may then be normalized on a 0 to 1 point scale.

With respect to physical stress, exercise may include (e.g., be defined by) a binary variable from a survey response prior to experimental data collection. If the subject had exercised within some predetermined amount of time before their work shift (e.g., in the morning prior to the study) the value would be 0, if the subject had not, the value would be 1.

With respect to physical stress, work may include (e.g., be defined by) a binary variable from a survey response prior to experimental data collection. If the participant had worked 8 or less hours the day prior to the study, they would receive a 1, if they had worked over 8 hours, they would receive a 0.

With respect to physical stress, hydration may include (e.g., be defined by) a continuous variable from a survey response prior to experimental data collection. Hydration sleep may be recorded using a Likert scale of 1 to 5, 1 being poor quality, and 5 being high quality. The value may then be normalized on a 0 to 1 point scale.

With respect to physical stress, stimulant may include (e.g., be defined by) a binary variable from a survey response prior to experimental data collection. If the subject had the usual amount of caffeine prior to the study, the value would be 1, if they had more or less caffeine than they usually have the value would be 0.

With respect to physical stress, nutrition may include (e.g., be defined by) as a binary variable from a survey response prior to experimental data collection. If the subject had the usual nutritional meal prior to the study, the value would be 1, if they had less of a nutritional meal then they usually have the value would be 0.

With respect to mental stress, experience may include (e.g., be defined by) responses from survey data collected prior to experimental data collection. The first response may be a binary response about the subject's experience with combat mission. If the subject has experience flying combat mission, the value is 1, if not, the value is 0. The second response may be a binary response about the subject's experience with multi-crew aircraft. If the subject has experience flying multi-crew aircraft, the value is 1, if not, the value is 0. The next response may be a continuous variable representing the years of service the subject has. For example, it can be expected the responses range from 1 to 20 years of experience based on typical subject population. The value may be normalized on a 0 to 1 point scale. The next response may be related to the role the subject is currently in and how many years they have been performing that role. The role hierarchy was exemplarily determined by a helicopter pilot Subject Matter Expert (SME). It can be expected that there would be a range of 1 to 3 years performing that role based on SME input. The two responses will be normalized on a 0 to 1 point scale. The total helicopter hours are recorded and normalized on a scale of 0 to 10,000. Additionally, the number of helicopter hours in the last 30 days may be normalized on a scale of 0 to 50 hours.

With respect to mental stress, cognitive workload may include (e.g., be defined by) transformed electrocardiogram (ECG) data from experimental data collection. The University of Iowa has a validated form of detecting real-time cognitive workload values of a subject using their Cognitive Assessment Toolset (CATS) hardware and software. CATS collects and normalizes workload values on a 1-to-10-point scale.

With respect to mental stress, situational awareness may include (e.g., be defined by) perception, comprehension, and prediction. Perception may be the number of seconds between the most recent UAV message arriving and it being seen by the participant. Comprehension may be the number of seconds the user has spent looking at the HMI in the past 30 seconds. If the ratio of time between looking at the HMI and looking elsewhere in the last 30 seconds is used as the weight, comprehension and perception may be derived from eye tracking data. Prediction may be a combination of the helicopter flight path and location.

With respect to external stress, terrain may include (e.g., be defined by) a binary variable from experimental data collection. The pilot is to fly the helicopter 0-25 feet above the highest obstacle. If the helicopter is 25 ft or above the highest obstacle, the value is 0. If the pilot is flying 0-25 ft above the highest obstacle the value is 1.

With respect to external stress, target ID may include (e.g., be defined by) a binary variable from experimental data collection. Targets are identified as priority or non-priority. The priority targets will have a value of 0 and the non-priority targets will have a value of 1.

With respect to external stress, wind may include (e.g., be defined by) a binary variable from experimental data collection. Wind may be artificially changed during a scenario. Wind greater than 10 knots may have a value of 0 and wind less than 10 knots will have a value of 0.

With respect to external stress, visibility may include (e.g., be defined by) a continuous variable from experimental data collection. The visibility ranges from 3 miles to 15 miles. It is standard for helicopters to not fly with less than 3 miles of visibility. The value will be normalized on a 0 to 1 point scale.

With respect to external stress, UAV battery may include (e.g., be defined by) a continuous variable from the experimental data collection. The ratio between how much battery is left and mileage needed to complete the mission may be compared and normalized to a 0 to 1 point scale.

With respect to external stress, helicopter fuel may include (e.g., be defined by) a continuous variable from the experimental data collection. The fuel range is 0-400 gallons and will be normalized on a 0 to 1 point scale.

With respect to external stress, missile count may include (e.g., be defined by) a discrete variable from the experimental data collection. The helicopter starts with 2 missiles. The appropriate number of missiles is determined by the experiment scenario. For instance, if a missile should've been released but wasn't the LRPM status would be zero. If a missile was released but it was appropriate, the LRPM status would be 1.

With respect to external stress, deployed UAVs may include (e.g., be defined by) a discrete variable from the experimental data collection. There should be 4 UAVs deployed at all times. The value could be 0, 1, 2, 3, or 4 and will be normalized to a 0 to 1 point scale.

With respect to external stress, stored UAVs may include (e.g., be defined by) a discrete variable from the experimental data collection. The appropriate number of stored UAVs is determined by the experiment scenario. For instance, if an UAV is attritted, an additional UAV should be deployed and having 1 UAV stored would be appropriate. If the number of stored UAVs is appropriate, the value is 1, if not, the value is 0.

With respect to external stress, loss of comms may include (e.g., be defined by) a continuous variable from experimental data collection. The status of the comms will be artificially displayed on a 0 to 100% scale. The value will then be normalized on a 0 to 1 point scale.

With respect to external stress, throttle stuck may include (e.g., be defined by) a binary variable from the experimental data collection. The throttle will be artificially "stuck" at certain times during the scenario and the subject will have to manage the effects with the collective. The throttle being stuck will have a value of 0 and the throttle not being stuck will have a value of 1.

With respect to external stress, rudder pedal stuck may include (e.g., be defined by) a binary variable from the experimental data collection. The throttle will be artificially "stuck" at certain times during the scenario and the helicopter will only be able to turn in one direction. The rudder being stuck will have a value of 0 and the rudder not being stuck will have a value of 1.

With respect to external stress, decision accuracy may include (e.g., be defined by) the accuracy of the decision, 1 if the most recent decision was correct, 0 otherwise. Decision speed may include (e.g., be defined by) the number of seconds between seeing the information on the HMI and acting on it.

With respect to external stress, helicopter location may include (e.g., be defined by) whether the helicopter is in the kill zone or not; 1 if not in a kill zone, 0 otherwise.

With respect to the example embodiment of FIG. 3, for example, the UAV-HMI presented to the human operator may have two primary tasks: display UAV alert information to the subject and collect the operator's decisions and/or commands back to the UAV simulator. The UAV team may not be directly operated by a human, rather the human operator may provide the UAV team commands, and the UAV team achieves those goals through flight and coordination autonomous algorithms. Communication may be event based and comes in the form of alerts.

These alerts flow across the Kafka network interface to the HMI, which presents (e.g., displays) them to the human operator.

Once each alert is noted by the human operator, the Human Machine Interface (HMI) may present the available options to the user for what commands to give in response to this information. Sometimes those commands go to the UAV, sometimes to other aspects of the simulation.

The adaptive HMI may take in the information from the CLA module. It may use this information to modify the displayed content.

There are many possible ways that the HMI could adapt, depending on the severity and level of time-sensitivity of the alert. For example, the HMI could delay decisions, present fewer options, highlight the recommended course of action, and/or provide many other adaptations to the human operator's current mental state and chance (e.g., probability) for error.

Performance (e.g., by at least one processor 106 and/or 120) of the causal loop analysis operation (e.g., which may use a trained AI and/or ML model) may use weightings. For example, the weightings may include weightings for some or all of the three stresses as follows: physical stress at 33.3%, external stress at 33.4%, and/or mental stress at 33.3%.

For example, the physical stress value may be calculated from some or all of five values, which for example, may be sub-weighted as follows: sleep at 20%, exercise at 20%, work at 20%, stimulant at 20%, and/or nutrition at 20%.

For example, the exercise stress value may be calculated from some or all of two values, which for example, may be sub-weighted as follows: whether the user exercised this morning at 50%, and/or how much exercise the participant gets on average at 50%.

For example, the mental stress value may be calculated from some or all of three values, which for example, may be sub-weighted as follows: training at 33.4%, situational awareness at 33.3%, and/or cognitive workload at 33.3%.

For example, the training stress value may be calculated from some or all of two values, which for example, may be sub-weighted as follows: a recency of relevant training at 50%, and/or lifetime experience at 50%.

For example, the lifetime experience stress value may be calculated from some or all of two values, which for example, may be sub-weighted as follows: total hours of helicopter training at 17%, combat missions flown at 17%, flown multicrew at 17%, years of service at 16%, current service role at 16%, and/or years in helicopter-related roles at 17%.

Figure 4:
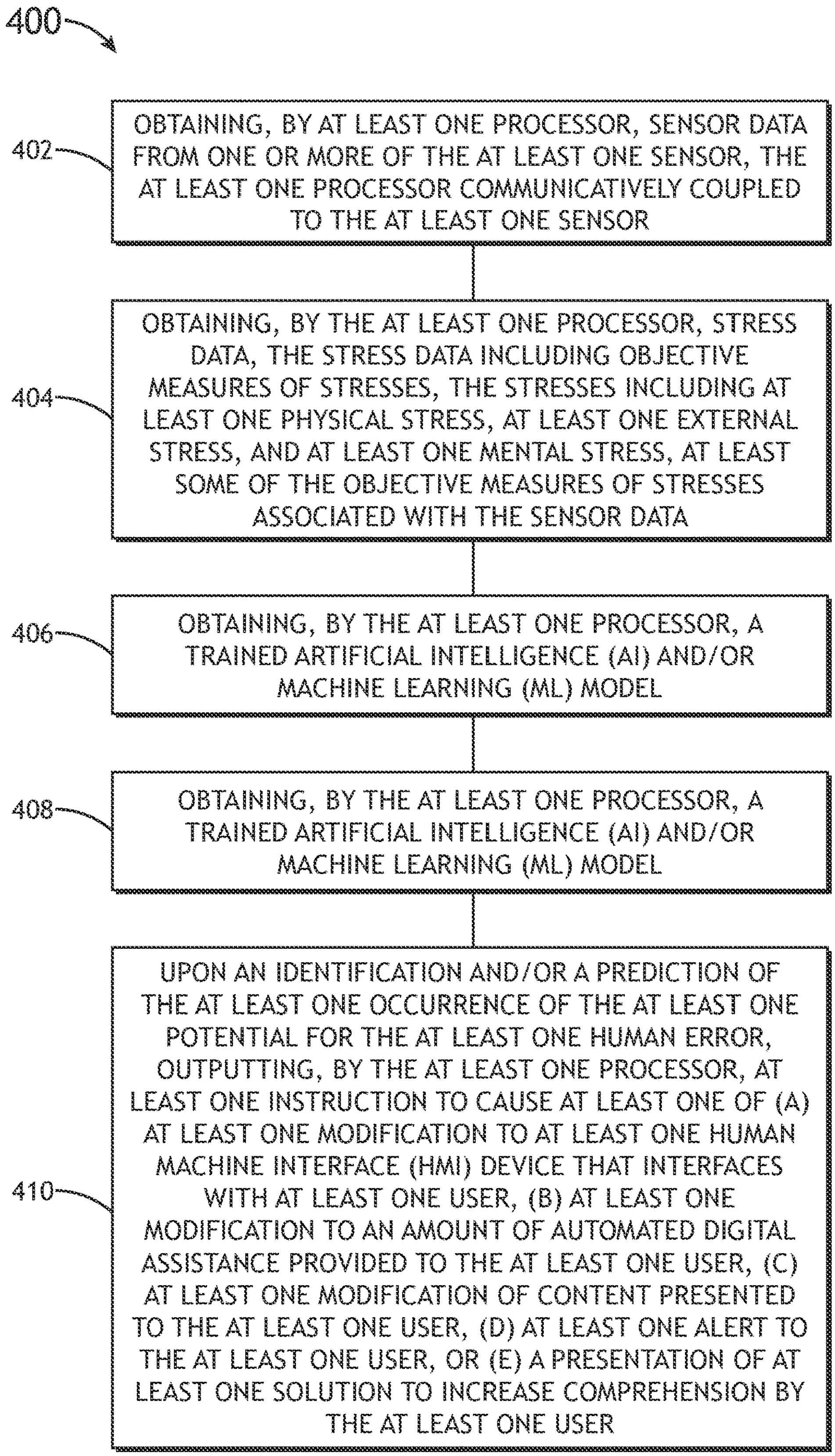
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one or more instances of the method 400 iteratively, concurrently, and/or sequentially. Additionally, for example, at least some of the steps of the method 400 may be performed in parallel, iteratively, and/or concurrently. Additionally, in some embodiments, at least some of the steps of the method 400 may be performed non-sequentially.

A step 402 may include obtaining, by at least one processor, sensor data from one or more of the at least one sensor, the at least one processor communicatively coupled to the at least one sensor.

A step 404 may include obtaining, by the at least one processor, stress data, the stress data including objective measures of stresses, the stresses including at least one physical stress, at least one external stress, and at least one mental stress, at least some of the objective measures of stresses associated with the sensor data.

A step 406 may include obtaining, by the at least one processor, a trained artificial intelligence (AI) and/or machine learning (ML) model.

A step 408 may include based at least on the stress data and the trained AI and/or ML model, at least one of (i) identifying, by the at least one processor, at least one occurrence of at least one potential for at least one human error or (ii) predicting, by the at least one processor, the at least one occurrence of the at least one potential for the at least one human error.

A step 410 may include upon an identification and/or a prediction of the at least one occurrence of the at least one potential for the at least one human error, outputting, by the at least one processor, at least one instruction to cause at least one of (a) at least one modification to at least one human machine interface (HMI) device that interfaces with at least one user, (b) at least one modification to an amount of automated digital assistance provided to the at least one user, (c) at least one modification of content presented to the at least one user, (d) at least one alert to the at least one user, or (e) a presentation of at least one solution to increase comprehension by the at least one user.

Further, the method 400 may include any of the operations disclosed throughout.

Referring generally again to FIGS. 1-4, as will be appreciated from the above, embodiments of the inventive concepts disclosed herein may be directed to a method and system including sensors and at least one processor configured to, based at least on stress data, at least one of (i) identify at least one occurrence of at least one potential for at least one human error or (ii) predict the at least one occurrence of the at least one potential for the at least one human error.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system comprising:

at least one sensor configured to measure sensor data including objective measures of stresses corresponding to at least one human vehicle operator; and at least one processor communicatively coupled to the at least one sensor, wherein the at least one processor is configured to:

obtain the sensor data from the at least one sensor during vehicle operation by the at least one human vehicle operator;

obtain stress data, the stress data including the objective measures of stresses, the stresses including at least one physical stress, at least one external stress, and at least one mental stress, at least some of the objective measures of stresses associated with the sensor data;

obtain a causal artificial intelligence (AI) model based on at least a human factors causal loop analysis;

based at least on the stress data and the the causal AI model, at least one of (i) identify at least one occurrence of at least one potential for at least one human error or (ii) predict the at least one occurrence of the at least one potential for the at least one human error; and upon the identification and/or the prediction of the at least one occurrence of the at least one potential for the at least one human error, output at least one instruction to cause one of an increase in automation of the vehicle operation to offset human vehicle operator task load and/or information processing when cognitive workload is determined to exceed a level of a risk parameter or a decrease in automation of vehicle operation to the offset human vehicle operator task load and/or information processing when the cognitive workload is determined to be less than the level of the risk parameter.

2. The system of claim 1, wherein the at least one vehicle comprises at least one of at least one aircraft or at least one spacecraft.

3. The system of claim 2, wherein the at least one vehicle comprises the at least one aircraft, wherein the at least one aircraft comprises at least one manned aircraft.

4. The system of claim 2, wherein the at least one vehicle comprises the at least one aircraft, wherein the at least one aircraft comprises at least one unmanned aerial vehicle (UAV).

5. The system of claim 4, wherein the at least one UAV comprises multiple UAVs, wherein at least two of the multiple UAVs are configured to be operated by a single user of the at least one user human vehicle operator of the at least one human vehicle operator.

6. The system of claim 1, wherein the at least one physical stress comprises at least one measurement of at least one of: at least one nutrition factor, at least one work factor, at least one exercise factor, at least one sleep factor, at least one hydration factor, or at least one stimulant factor.

7. The system of claim 6, wherein the at least one physical stress comprises the measurements of the at least one nutrition factor, the at least one work factor, the at least one exercise factor, the at least one sleep factor, the at least one hydration factor, and the at least one stimulant factor.

8. The system of claim 1, wherein the at least one external stress comprises at least one measurement of at least one of: at least one execution factor, at least one machine status factor, or at least one world factor.

9. The system of claim 8, wherein the at least one external stress comprises the measurements of the at least one execution factor, the at least one machine status factor, and the at least one world factor.

10. The system of claim 1, wherein the at least one mental stress comprises at least one measurement of at least one of: at least one situation awareness factor, at least one cognitive workload factor, or at least one training factor.

11. The system of claim 10, wherein the at least one mental stress comprises the measurements of the at least one situation awareness factor, the at least one cognitive workload factor, and the at least one training factor.

12. The system of claim 1, wherein the stress data includes subjective measures of the stresses and the objective measures of the stresses, wherein some of the stress data is collected in real-time and other of the stress data is collected prior to in real-time, wherein some of the stresses are directly measurable, wherein other of the stresses are not directly measurable.

13. The system of claim 1, wherein the model causal AI model uses weightings, the weightings comprising a first weighting of at least 20% for the at least one physical stress, a second weighting of at least 20% for the at least one external stress, and a third weighting of at least 20% for the at least one mental stress, wherein the weightings total 100%.

14. The system of claim 13, wherein the at least one physical stress is multiple physical stresses comprising at least one nutrition factor, at least one work factor, at least one exercise factor, at least one sleep factor, and at least one stimulant factor, wherein the first weighting for the multiple physical stresses comprises physical stress sub-weightings of at least 10% for each of the at least one nutrition factor, the at least one work factor, the at least one exercise factor, the at least one sleep factor, and the at least one stimulant factor, wherein the physical stress sub-weightings total 100%.

15. The system of claim 13, wherein the at least one mental stress is multiple mental stresses comprising at least one situation awareness factor, at least one cognitive workload factor, and at least one training factor, wherein the second weighting for the multiple mental stresses comprises mental stress sub-weightings of at least 15% for each of the at least one situation awareness factor, the at least one cognitive workload factor, and the at least one training factor, wherein the mental stress sub-weightings total 100%.

16. The system of claim 13, wherein the at least one physical stress is multiple physical stresses comprising at least one nutrition factor, at least one work factor, at least one exercise factor, at least one sleep factor, and at least one stimulant factor, wherein the first weighting for the multiple physical stresses comprises physical stress sub-weightings of at least 10% for each of the at least one nutrition factor, the at least one work factor, the at least one exercise factor, the at least one sleep factor, and the at least one stimulant factor, wherein the physical stress sub-weightings total 100%, wherein the at least one mental stress is multiple mental stresses comprising at least one situation awareness factor, at least one cognitive workload factor, and at least one training factor, wherein the second weighting for the multiple mental stresses comprises mental stress sub-weightings of at least 15% for each of the at least one situation awareness factor, the at least one cognitive workload factor, and the at least one training factor, wherein the mental stress sub-weightings total 100%, wherein the at least one exercise factor comprises multiple exercise factors comprising whether each of the at least one human vehicle operator exercised within eight hours before a work shift of said user and an amount of exercise each of the at least one human vehicle operator gets on average, wherein each of the multiple exercise factors has an exercise factor sub-weighting of at least 25%, wherein the exercise factor sub-weightings total 100%, wherein the at least one training factor comprises multiple experience factors comprising a total number hours of aircraft training for each of the at least one human vehicle operator, a number of combat missions flown for each of the at least one human vehicle operator, whether each of the at least one human vehicle operator has a flown a multi-crew aircraft, a number of years of service in an industry for each of the at least one human vehicle operator, a current service role for each of the at least one human vehicle operator, and a number of years in aircraft-related roles for each of the at least one human vehicle operator, wherein each of the multiple experience factors has an experience factor sub-weighting of at least 10%, wherein the experience factor sub-weightings total 100%.

17. A method comprising:

obtaining, by at least one processor, sensor data including objective measures of stresses corresponding to a human vehicle operator from at least one sensor during vehicle operation by the human vehicle operator, the at least one processor communicatively coupled to the at least one sensor;

obtaining, by the at least one processor, stress data, the stress data including the objective measures of stresses, the stresses including at least one physical stress, at least one external stress, and at least one mental stress, at least some of the objective measures of stresses associated with the sensor data;

obtaining, by the at least one processor, a causal artificial intelligence (AI) model based on at least a human factors causal loop analysis;

based at least on the stress data and the causal AI model, at least one of (i) identifying, by the at least one processor, at least one occurrence of at least one potential for at least one human error or (ii) predicting, by the at least one processor, the at least one occurrence of the at least one potential for the at least one human error; and upon the identification and/or the prediction of the at least one occurrence of the at least one potential for the at least one human error, outputting, by the at least one processor, an increase in automation of the vehicle operation to offset human vehicle operator task load and/or information processing when cognitive workload is determined to be relatively high or a decrease in automation of vehicle operation to the offset human vehicle operator task load and/or information processing when the cognitive workload is determined to be relatively low.

* * * * *